United States Patent
Brehmer et al.

[19]

[11] Patent Number: 6,056,487
[45] Date of Patent: May 2, 2000

[54] COMPACT, HIGH THROUGH-PUT GEAR MACHINE

[76] Inventors: James D. Brehmer, W278 N2751 Rocky Point Rd., Pewaukee, Wis. 53072; Daniel P. Bird, N49W35498 Wisconsin Ave., Oconomowoc, Wis. 53066

[21] Appl. No.: 09/173,214

[22] Filed: Oct. 15, 1998

Related U.S. Application Data

[60] Provisional application No. 60/062,196, Oct. 16, 1997.

[51] Int. Cl.[7] .................................................. B23F 5/22
[52] U.S. Cl. ............................... 409/12; 409/11; 409/137
[58] Field of Search .................................. 409/2, 11, 12, 409/19, 20, 21, 22, 137

[56] References Cited

U.S. PATENT DOCUMENTS

| | | | |
|---|---|---|---|
| 4,329,096 | 5/1982 | Hersovici ................................... | 409/12 |
| 4,587,766 | 5/1986 | Miyatake et al. .......................... | 409/12 |
| 4,708,544 | 11/1987 | Faulstich et al. ......................... | 409/11 |
| 5,947,663 | 9/1999 | Egawa et al. ............................ | 409/137 |

OTHER PUBLICATIONS

Mitsubishi Heavy Industries, Ltd., Tokyo, Japan, NC Gear Hobbing Machine, GH400NC brochure, no date.
Kashifuji Works, Ltd., Kyoto, Japan, KN150CNC, Production Gear Hobbing Machine brochure, no date.

*Primary Examiner*—Daniel W. Howell
*Attorney, Agent, or Firm*—Quarles & Brady

[57] ABSTRACT

A compact high through-put gear cutting machine collects stress transmitting structure adjacent to the work piece significantly reducing the weight and cost of the machine while providing a high degree of rigidity. This structure is positioned so as not to collect hot metal chips resulting from the cutting process which are cleared through an opening in the structure to a tubular frame isolated in stress and heat from the stress structure. DC synchronous servo motors drive five of the axis slaved to the cutter axis which is an AC induction motor driven by a vector drive. A lightweight tubular frame replaces a cast iron frame traditional in such machines. A compact axis structure is obtained by eliminating a y-axis or cutter feed motor and synthesizing that motion through a relatively shallow z, ŷ axis table.

17 Claims, 4 Drawing Sheets

$$\frac{Z}{\hat{Y}} = \tan A$$

COMPACT, HIGH THROUGH-PUT GEAR MACHINE

CROSS REFERENCE TO RELATED APPLICATIONS

This application is based on provisional application Ser. No. 60/062,196 filed Oct. 16, 1997 entitled Compact, High Through-Put Gear Machine.

BACKGROUND OF THE INVENTION

The present invention relates to gear cutting machines and the like and in particular, to a compact, high through-put gear machine.

The cutting of gears may be performed on a gear machine in which a gear blank (workpiece) is rotated synchronously with a cutting tool (hub). The ratio of the rotational rates of the blank and cutter and the relative angle of rotation of the blank and cutter determine the gear tooth structure and must be accurately controlled.

Traditionally, the blank and cutter are driven by a conventional mechanical power train having a selectable gear drive for changing the relative rotation rate between these elements. The need for a precise gear drive with no play and the high demands for precision in gear cutting limit the through-put of such gear cutting machines. Through-put is a measure of how fast a gear can be cut.

With the advent of carbide hobs and high quality DC servo-drive systems, there has been some development efforts directed to high through-put gear machines in which rotation of the blank and cutter (and control of their relative rates of rotation) is performed electronically through a so-called electronic gear box driving independent DC servo motors. With elimination of the mechanical power train and the use of a carbide tool, the absolute speed of rotation of the blank and cutter may be increased significantly. Unfortunately, the cost of the large horsepower servo motors and the additional demands on machine rigidity caused by the faster cutting speeds, has made these initial machines extremely expensive. Further, the accuracy of these machines has not been fully acceptable.

SUMMARY OF THE INVENTION

The present invention provides a lower cost and more compact high through-put gear cutting machine by taking a different approach to its design. Rather than casting a larger base to provide the needed added rigidity to the machine, the stress transmitting structure of the machine is concentrated into a compact "armchair" frame supporting all the major machine axes. Consistent with this concentration of the support structure, cantilever in the cutter axis is minimized, while providing it with the needed degrees of freedom, by supporting it on a compact "z-ŷ" table and synthesizing motion along the cutter axis (y) with combined z and ŷ motion. This further minimizes overhang between the cutter and the armchair support. Driving motors for angulation of the cutter (A) and x-axis motion are placed in a balanced configuration inside and outside the armchair.

By concentrating the stress transmitting structure in the armchair as is made possible by the flexibility of a multiple DC servo motor drive, the armchair may be structurally isolated from a relatively lightweight base unit. Hot metal chips from the cutting process falling on the base thus do not cause thermal expansion of the critical armchair components. An opening in the armchair, beneath the cutting surfaces and a positioning of major armchair structure away from the path of the chips as is possible because of its compact structure, further allows hot chips from the cutting process to be diverted from the armchair itself.

The high feed and cutting rates implicit in the purpose of there machines has caused an unanticipated high thermal loading not present in earlier nonservo-driven machines. Although the applicants do not wish to be bound by a particular theory, it is believed that the hot chips heating the traditional cast iron base have caused thermal expansion that adversely affects the long term accuracy of these machines during repeated cuttings.

As a further consequence of this separation of the base from the structural elements of the armchair, the base may be advantageously constructed of lighter weight welded tube providing enclosed channels for cabling and providing, at a base, slots for fork lift tines so that the machine can be easily moved as is desirable in cell manufacturing operations.

The DC servo motors must be large enough to provide both cutting speed and precision. Such motors contribute significantly to the expense of the machine. The present inventors have recognized, however, that in contrast to other servo gear machines, at least one of the motors, typically the motor driving the cutter which has the highest horse power requirements, can thus be a relatively inexpensive AC induction motor. AC induction motors are not subject to accurate speed control under varying loads because of a torque related slippage intrinsic to their design. Nevertheless, an encoder placed on the drive shaft of the AC induction motor allows the other DC servo motors to accommodate variations in its speed satisfying the requirement of an extremely accurate ratio between motors even though the absolute motor and cutting speeds may vary somewhat.

These and other objects and advantages of the invention will be apparent from the claims which will be augmented when a regular utility filing is made.

DETAILED DESCRIPTION OF THE PREFERRED EMBODIMENT

Figure 1:
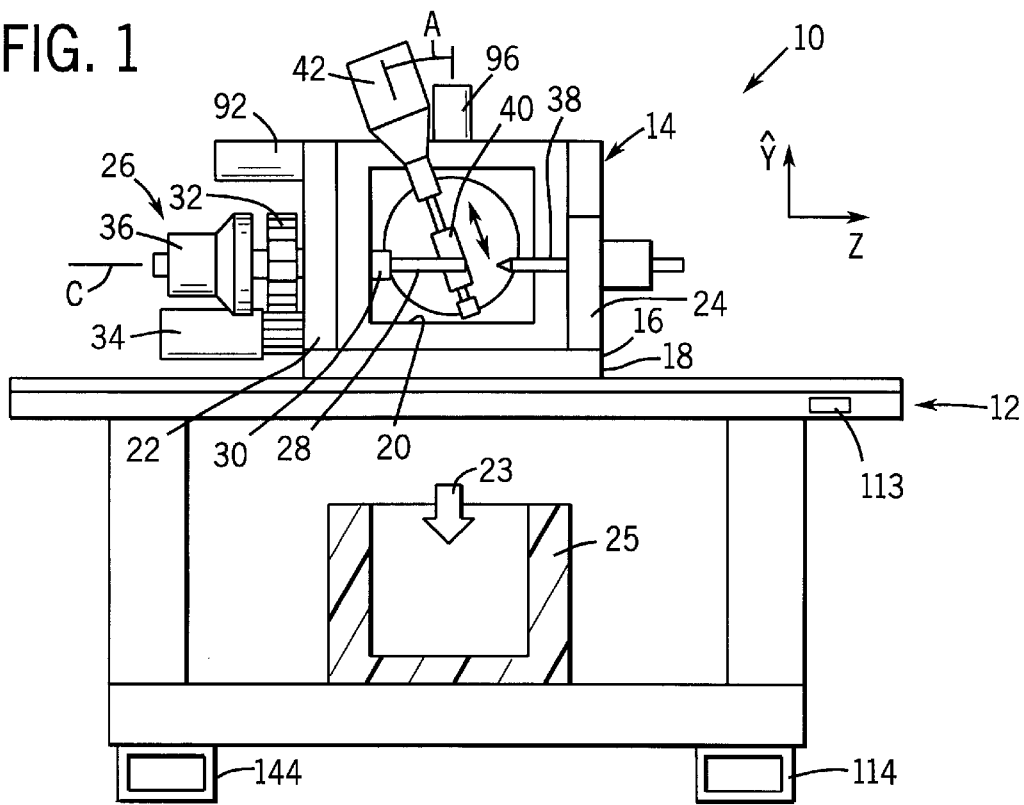
FIG. 1 is front elevational view of the present invention with protective shrouding removed showing a lightweight base of welded tubular members supporting a stress bearing armchair structure supporting the blank and cutter and showing the path of removal of hot metal chips away from the structure of the armchair.

Referring now to FIG. 1, the compact high through-put gear machine 10 of the present invention includes generally a base 12 supporting a compact stress-transmitting frame that will henceforth be termed an "armchair" 14. The armchair 14 provides generally a left and right vertical wall, rear vertical wall and lower horizontal wall joined to provide a portion of a rectangular prism.

The base 12 on which the armchair 14 rests is relatively lightweight unlike the castings used in prior art gear machines, and serves principally as a support to the armchair 14 and not for the transmission of stresses or the provision of rigidity between the gear cutting axes.

The armchair 14 is separated from the base 12 by a thin thermal and shock isolating gasket 18.

Figure 3:
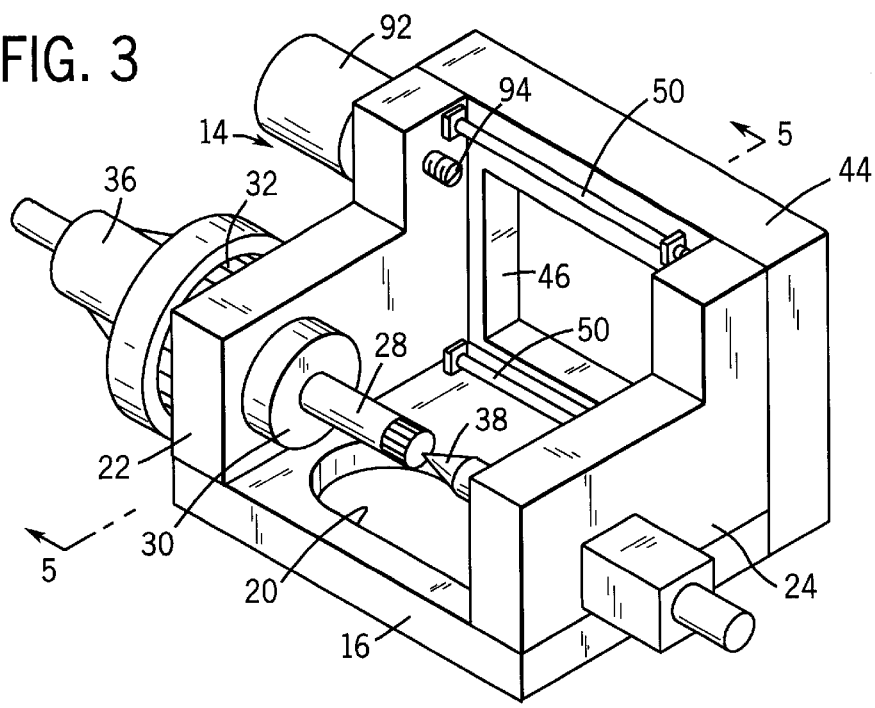
FIG. 3 is a perspective view of the armchair structure of FIG. 1 showing the blank holding structure but with the cutter axis and the x, z, and ŷ axis structure removed for clarity.

Referring now also to FIG. 3, a lower plate 16 forms the lower wall of the armchair 14 and includes a chip exit aperture 20 through which heated metal chips from the cutting process may pass as indicated by arrow 23. Heat from the chips thus does not expand the armchair 14, but rather passes by the principal structure of the armchair 14 into container 25 or onto base 12 whose heating and expansion is isolated from the armchair 14.

Attached in parallel opposition to the lower plate 16, as left and right walls of the armchair 14, are left and right support plates 22 and 24. In the preferred embodiment of the invention, the separation of the left and right support plates is approximately fourteen inches. Left support plate 22 rotatably holds a workpiece drive axis 26 in turn supporting a workpiece 28 about a workpiece axis C in a generally horizontal plane. The workpiece 28 is held by a collet 30 which rotates on bearings (not shown) held by left plate 22. A pneumatic collet actuating cylinder 36 communicates with the collet 30 to grip and release the workpiece 28 in response to a control signal. The collet 30 and cylinder 36 are hollow to allow for through spindle loading of parts when applicable. A sprocket 32 attached by a shaft (not shown) to the collet 30 and turned by means of a belt from a C-axis drive motor 34.

The right plate 24, opposing the left plate 22, supports a live renter 38 that engages the outwardly extending end of workpiece 28 against cross axis bending forces when cutting operations are performed.

Figure 2:
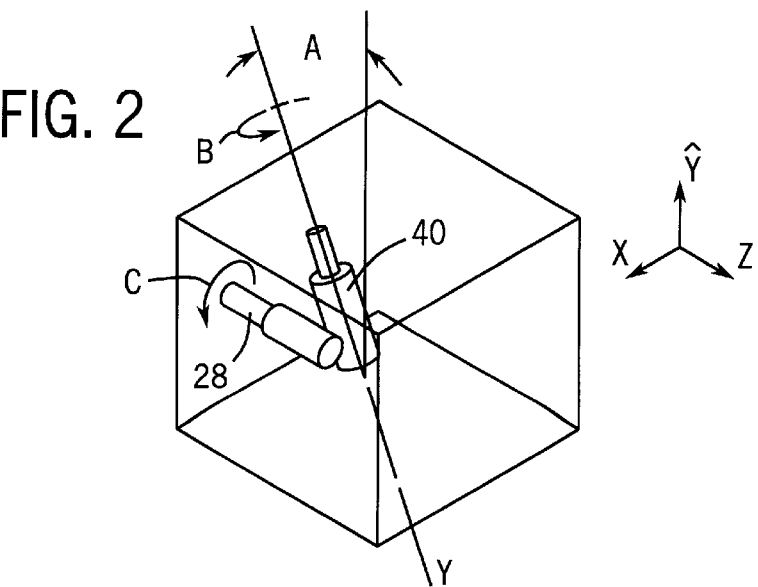
FIG. 2 is a perspective schematic view of the blank and the cutter of the machine of FIG. 1 showing and labeling the various axis of movement of the machine.

Referring to FIGS. 1 and 2, a cutter 40 is positioned to the side of the extreme end of workpiece 28 over aperture 20 at an angle A from vertical in contract with the workpiece 28. The cutter 40 is driven by B-axis drive motor 42 so as to rotate at a rate that varies slightly (as will be described below) but that is in a precise predetermined ratio to the rate of rotation of workpiece 28 as driven by C-axis drive motor 34. The cutter 40 is held to rotate about an axis in a vertical plane having an angle A with respect to vertical. This angle A may be changed depending G n the gear being cut. Further, the cutter 40 may be moved in a vertical axis along a ŷ direction, or may be moved horizontally along the extent of the workpiece 28 in a z-axis or closer to or further away from the workpiece 28 in an x-axis. Each of these axes ŷ, z and x employs a separate servo motor and mechanism as will be described.

During the cutting of a gear, it is also desirable to move the cutter 40 along its axis of rotation or in the y-direction so as to equalize wear on the cutter tooth surface. The present invention provides no direct means of moving in the y-direction, but synthesizes such y-movement through simultaneous control ratio motion of the z-and ŷ axes as will be described.

Referring now to FIG. 3, the left and right side plates 22 and 24 are spanned by a rear, vertically extending plate 44 forming the rear wall of the armchair 14. The rear plate 44 has a central aperture 46 through which a mechanism supporting the cutter 40 may be inserted as shown in FIG. 1. Horizontal guide ways 50 are positioned above and below the aperture 46 to support z-axis table 52 against the rear plate 44 shown in FIG. 4 for motion left and right in the z-axis with respect to the rear plate 44. The ways 50 may be ball slides such as are known in the art supported on pillow blocks according to conventional techniques. Z-axis table 52 may thus slide with respect to the armchair 14 in the z-axis.

Figure 4:
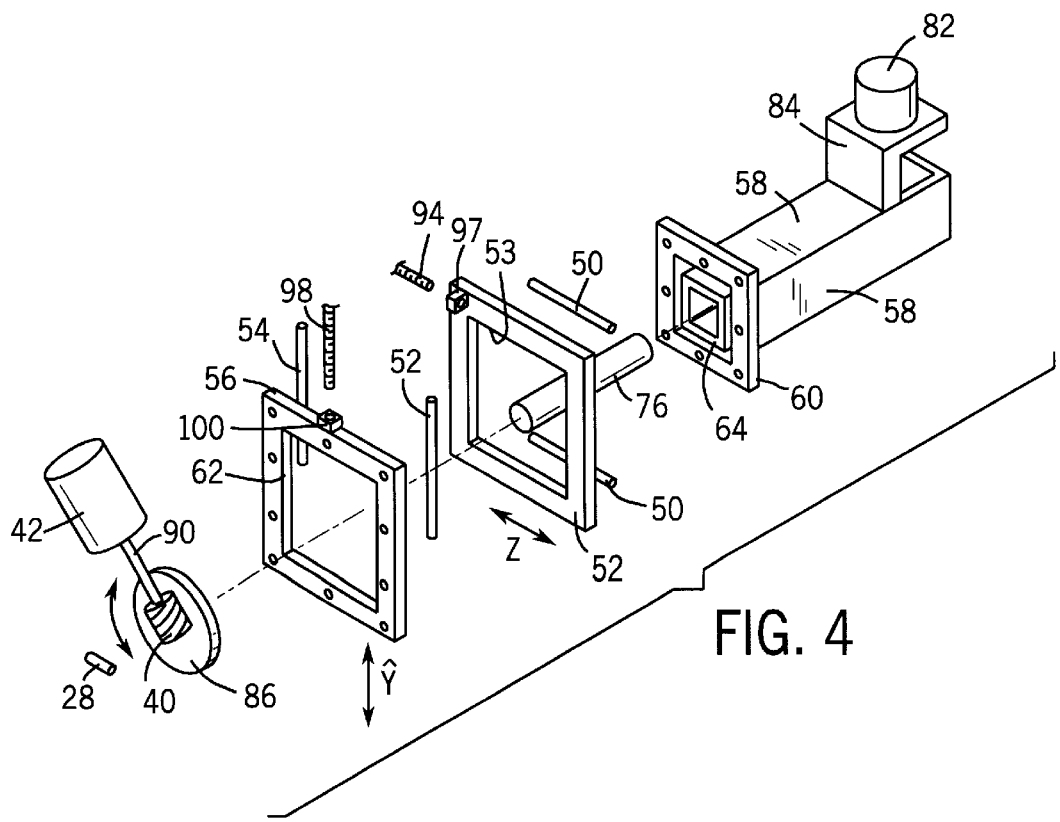
FIG. 4 is a simplified, exploded perspective view of the cutter axis and the x, z, and ŷ structure.
Figure 5:
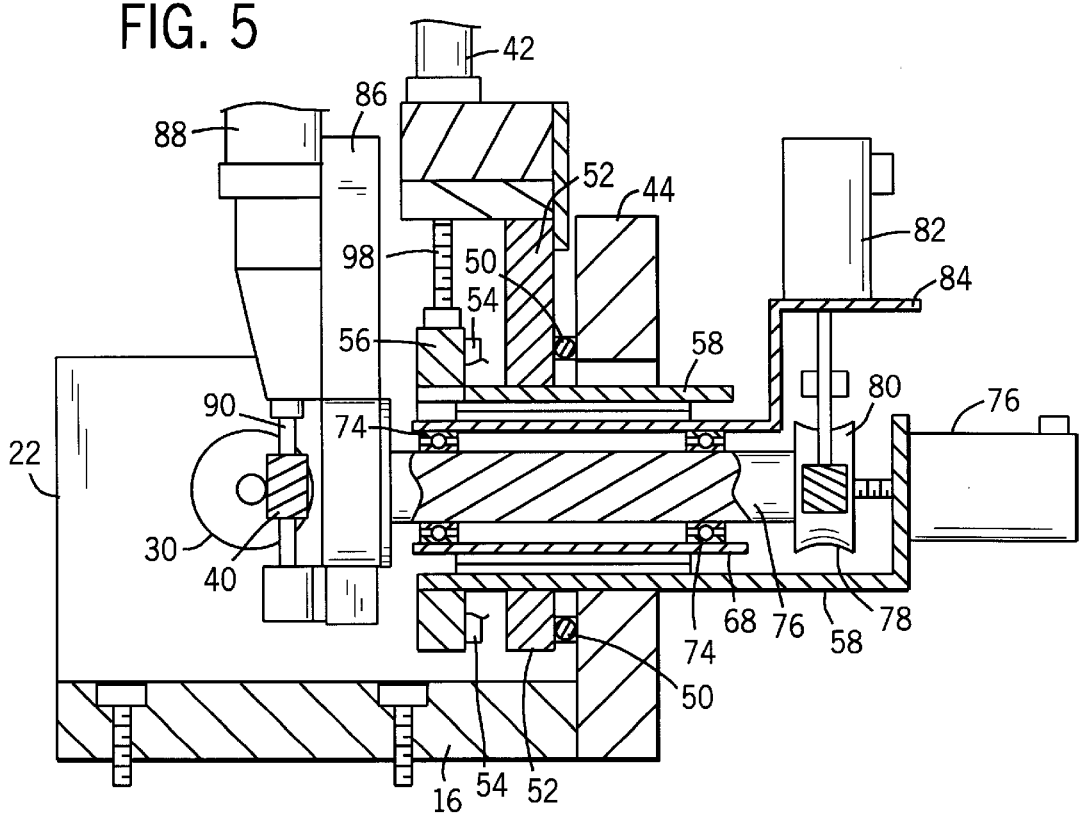
FIG. 5 is a cross-sectional view taken along line 5—5 of FIG. 3 showing the x, z, and ŷ supporting structure of FIG. 4 when assembled into the armchair of FIG. 3 and the use of an x-z table to reduce effective overhang and further showing the balancing effect of motor placement.

Referring now to FIGS. 3 and 4 and 5, a z-axis drive motor 92 attached to the rear plate 44 includes a lead screw 94 received by a nut 97 on the z-axis table 52 to provide z-axis motion thereto.

A second set of ways 54, extending vertically in the ŷ axis and attached to the surface of the z-axis table 52 removed from plate 44, join the z-axis table 52 and a ŷ-axis table 56 so that the ŷ-axis table 56 may move with respect to the z-axis table in a vertical or y direction. Referring also to FIG. 5, the ŷ-axis table 56 and z-axis table 52 may lie very close to one another separated only by the ways 54 and 50 and thus provide very little cantilever away from plate 44. Referring also to FIGS. 1 and 4, a ŷ axis drive motor 96 drives a lead screw 98 shown in FIG. 4 received by a nut 100 on the ŷ axis table 56 to impart a ŷ motion to that frame.

A rectangular support outer tube 58 having a flange 60 on its front surface may attach to the rear surface of the ŷ-axis table 56 to be affixed about a central aperture 62 of the ŷ-axis table 56. The rectangular support outer tube 58 then passes through a central aperture 53 of z-axis table 52 sized to be adequate to allow several inches of ŷ axis motion between the outer tube 58 and the inner walls of aperture 53.

Figure 6:
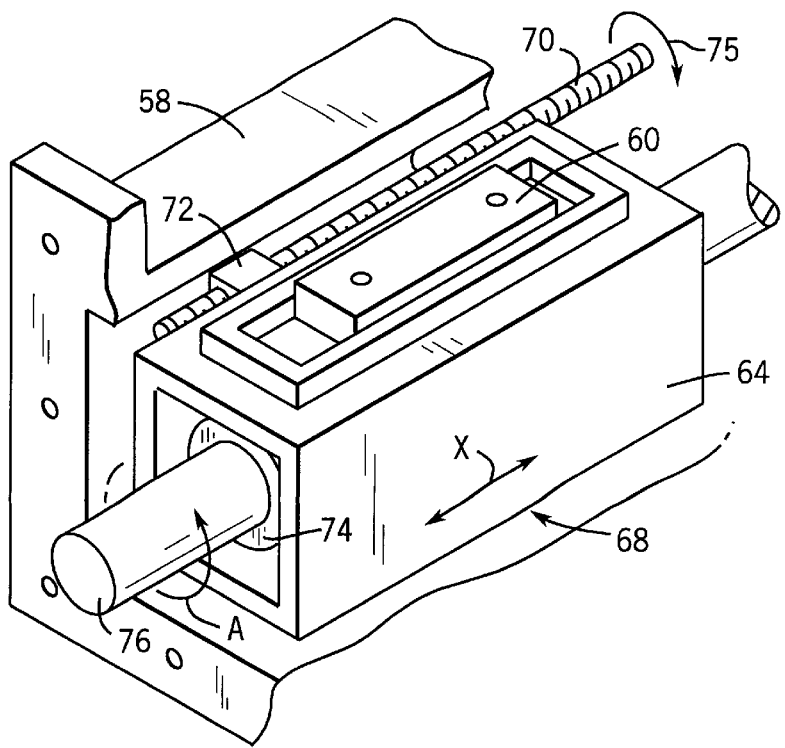
FIG. 6 is a fragmentary perspective view of the mechanism of FIG. 4 showing the provision of the various motions provided by that structure.

Referring now to FIGS. 4, 5, and 6, the rectangular outer tube 58 supports slidably on its inner surface a second rectangular inner tube 58 held coaxially with rectangular outer tube 58 by upper way assembly 66 and lower way assembly 68. Upper way assembly 66 and lower way assembly 68 join the upper and lower surfaces of inner tube 58 with the lower and upper inner surfaces of outer tube 58, respectively, allowing for x-axis movement as indicated by the arrow. The x-axis motion is imparted by a screw thread 70 passing on the side of inner tube 58 within outer tube 58 to be received by a nut 72 attached to inner tube 58 so that rotary motion 75 provided by x-axis drive motor 77 (shown in FIG. 5) moves inner tube 58 in the x-direction with respect to outer tube 58. X-axis drive motor 77 is attached to outer tube 58 so that the motion of inner tube 58 is with respect to outer tube 58 and thus with respect to ŷ-axis table 56 to which outer tube 58 is connected.

The ways 66 and 68 may be low friction recirculating ball ways such as are well understood in the art. The nut 72 may be a recirculating ball nut.

Held within inner tube 58 on bearings 74 is shaft 76 rotatable in the A axis as indicated. The rear end of shaft 76 supports a coaxially oriented gear 78 driven at right angles by worm gear 80 attached by a shaft to A-axis drive motor 82. A-axis drive motor 82 is supported by a bracket 84 attached to move with inner tube 58.

Referring now to FIGS. 4 and 5, the end of shaft 76 extending toward the workpiece 28 supports an arm 86 holding B-axis drive motor 42 having a shaft 90 perpendicular to the shaft 76 and to which the cutter 40 is attached. Rotation of the shaft 76 by A-axis drive motor 82 changes the angle A, the angle at which the cutter 40 addresses the workpiece 28.

Thus, there are six axes of motion driven by a corresponding six motors.

Figure 7:
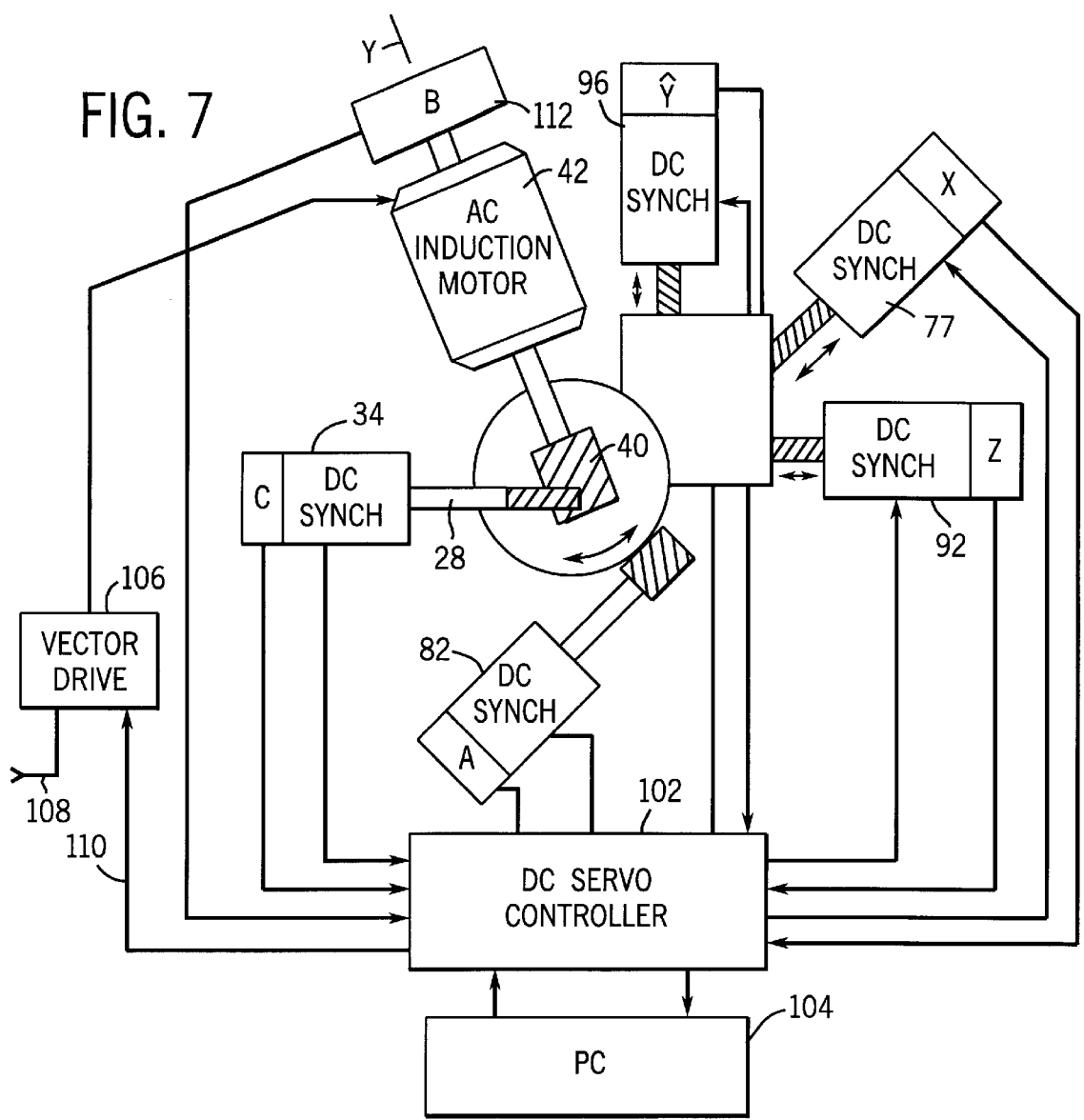
FIG. 7 is a schematic representation of the electrical interconnections of the various DC synchronous motors and AC induction motor as controlled by a DC servo controller and a PC-type computer.

Referring now to FIG. 7, each of the axis of: C, driven by C-axis drive motor 34, A, driven by A-axis drive motor 82, ŷ, driven by ŷ-axis drive motor 96, x, driven by x-axis drive motor 77, and z, driven by z-axis drive motor 92, employ a standard DC synchronous motor with an encoder connected to a commercially available motion control board 102 of a kind understood to those of ordinary skill in the art. The motion control FVboard 102 under instructions from a PC-type computer 104, provides the necessary voltage and current wave forms to the DC synchronous motors to move them under feedback command at given rates and for given increments in a precise manner.

In contrast, B-axis drive motor 42 driving the cutter 40 requiring the greatest horse power, uses instead of a synchronous motor, an AC induction motor. As is understood in the art, AC induction motors rely for their torque on a degree of slipping and thus are not well suited to precise control. Nevertheless, they are far cheaper for a given horsepower and may be controlled roughly in speed by a vector drive 106 receiving line current 108 and a position command 110 from the motion control board 102. The vector drive 106 provides a base speed of 1,750 RPM and a top speed of 4,000 RPM for B-axis drive motor 42.

The AC induction motor used for B-axis drive motor 42 includes a separate encoder 112 which is received by the DC servo controller so that C-axis drive motor 34 may be locked at a given frequency to the motion of B-axis drive motor 42 despite slight variations in the speed of B-axis drive motor 42.

In other words, the ratio of speeds of B-axis drive motor 42 and motor 34 are precisely locked by the DC servo controller by servo action while the absolute speeds of the motors vary somewhat according to the variable frequency drive and the changes in loading on the cutter 40. It will be understood that either of motors 42 and 34, but only one of motors 42 and 34, may be an AC induction machine with the other machine slaved to it for this precise ratio control.

Figure 8:
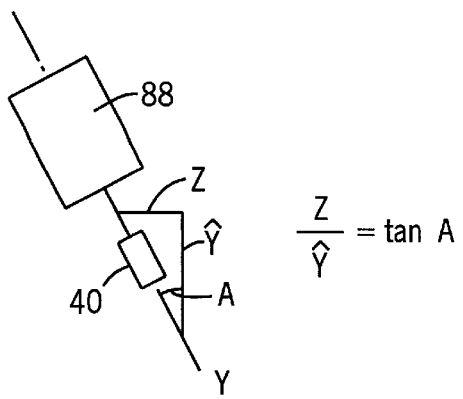
FIG. 8 is a simplified graphical representation of the cutter axis showing a virtual y axis movement for wear control of the cutter as realized by z and ŷ axis movement without the need for an additional y axis translation motor.

During the cutting of the workpiece 28, it may be desirable to move the cutter 40 back and forth along the y-axis to distribute wear of the cutter 40. Nevertheless, in order to provide the most compact possible mechanism to the gear machine 10 thereby ensuring a high degree of rigidity of the mechanism, the B-axis drive motor 42 and cutter 40 are not placed on a slide to move directly in the y-direction. In the present invention, instead, y-axis motion is synthesized as indicated in FIG. 8 by simultaneous motion of the z and ŷ axes according to the equation:

$$z/ŷ = \tan(A)$$

Back and forth motion of the cutter 40 along the y-axis is thus provided for wear control.

Referring again to FIG. 1, the ability to construct the base 12 out of tubular members allows it to be relatively lightweight compared to the cast iron bases typically used in such machine designs. The tube members are provided with various access panels 113 to allow them to be used as guide ways for cabling and the like. Two tubular members 114 run the depth of the base as feet for the base 12 and are sized so as to receive the tines of a fork lift allowing ready movement of the machine 10 when reconfiguring a production line or the like. The tubular members of the base 12 are attached to plate metal panels providing increased rigidity of the base while maintaining its light weight made possible by the fact that it is not required to conduct the stresses of the machining operation.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A gear cutting machine comprising:
   a stand providing support against a shop floor;
   an axis support frame supported by the stand in a predetermined orientation, the frame including a first and second vertically extending opposed side walls, the side walls spanned and affixed at rear edges to a vertically extending rear wall, the side walls further spanned and affixed at bottom edges to a bottom wall, the bottom wall including a chip discharge aperture, the walls partially enclosing a work volume;
   a workpiece chuck, for holding a gear blank, and a tail stock attached to ones of the first and second side walls, in opposition, to extend into the work volume; and
   a cutter head having a tool holder holding a gear cutting tool, the cutter head attached to the rear wall and extending into the work volume;
   wherein the chip discharge aperture is positioned beneath the cutting tool and is sized to allow discharge of cut metal chips without substantial heating of the axis support frame.

2. The gear cutting machine of claim 1 wherein the stand and axis support frame are separate elements held together by bolts passing through adjacent surfaces of the bottom wall of the axis support frame and an upper wall of the stand.

3. The gear cutting machine of claim 1 wherein the stand comprises welded tubular steel.

4. The gear cutting machine of claim 1 wherein the rear wall includes a rear wall aperture and wherein the cutter head includes a positioning motor assembly moving the tool holder with respect to a gear blank held within the workpiece chuck, wherein the positioning motor assembly is located outside the work volume and the tool holder is located inside the work volume and the tool holder communicates with the positioning motor assembly through the rear wall aperture;
   whereby distance between the point of attachment of the cutter head to the rear wall and the workpiece is reduced.

5. The gear cutting machine of claim 1 wherein the positioning motor assembly includes a first motor moving the tool holder along an axis perpendicular to the rear wall and a second motor rotating the tool holder about the axis.

6. The gear cutting machine of claim 5 wherein the cutter head is supported against the rear wall by a z-y table assembly mounted for horizontal and vertical movement of the cutter head with respect to the rear wall as driven by a z and a y motor, respectively, and wherein the z and y motors are positioned outside the work volume;
   whereby distance between the point of attachment of the cutter head to the rear wall and the workpiece, and the distance between the workpiece chuck and tail stock is reduced.

7. The gear cutting machine of claim 6 wherein one of the side walls includes an aperture allowing communication of the z-motor with the z-y table.

8. The gear cutting machine of claim 6 including a motor controller communicating with the z and y motors and the second motor of the position motor assembly for simultaneous driving of the z and y motors so as to move the tool holder along an arbitrary axis aligned with a rotation axis of the tool without the need for additional mechanical structure;

whereby distance between the point of attachment of the cutter head to the rear wall and the workpiece is reduced.

9. The gear cutting machine of claim 1 wherein the cutter head includes a cutter head motor communicating with the tool holder via an upwardly extending shaft, and wherein the cutter head motor is positioned above and outside the work volume;

whereby distance between the point of attachment of the cutter head to the rear wall and the workpiece is reduced.

10. A gear cutting machine comprising:

a workpiece chuck for holding a gear blank for rotation about a first axis;

a cutter head having a tool holder holding a gear cutting tool adjacent to the workpiece for rotation about a second axis;

a DC servo motor having a shaft communicating with one of the workpiece chuck and tool holder;

an AC induction motor having a shaft communicating with an other of the workpiece chuck and tool holder;

a position encoder attached to the shaft of the AC induction motor to provide a position signal indicating the angular position of the shaft of the AC induction motor;

a DC servo controller receiving the position signal from the position encoder and driving the DC servo motor synchronously with the rotation of the AC induction motor;

whereby the tool holder and workpiece chuck may be driven synchronously.

11. The gear cutting machine of claim 10 wherein the AC induction motor is connected to the tool holder and the DC servo motor is connected to the workpiece chuck.

12. A gear cutting machine comprising:

an axis support frame supported by a stand in an orientation, the frame including a first and second vertically extending, opposed side walls, the side walls spanned and affixed at rear edges to a vertically extending rear wall, the side walls further spanned and affixed at bottom edges to a bottom wall, the walls defining four sides of a rectangular prism to partially enclose a work volume;

a workpiece chuck for holding a gear blank and a tail stock attached to a respective first and second side wall, in opposition, to extend into the work volume;

a chuck motor communicating with the workpiece chuck through a first aperture in a first side wall, the chuck motor positioned outside the work volume;

a cutter head having a tool holder holding a gear cutting tool, the cutter head attached to the rear wall and extending into the work volume; and a positioning motor assembly communicating with the cutter head positioning the cutter head with respect to a gear blank held within the workpiece chuck, wherein the positioning motor assembly is located outside the work volume and the cutter head is located inside the work volume and the tool holder communicates with the positioning motor assembly through an aperture in the rear wall;

whereby distance between a point of cutting of the workpiece and the walls is reduced.

13. The gear cutting machine of claim 12 further including:

a stand providing support against a shop floor;

wherein the stand and axis support frame are held together by bolts passing through adjacent surfaces of the bottom wall of the axis support frame and an upper wall of the stand.

14. The gear cutting machine of claim 12 wherein the positioning motor assembly includes a first motor moving the tool holder along an axis perpendicular to the rear wall and a second motor rotating the tool holder about the axis.

15. A method of high speed dry cutting of gears comprising the steps of:

(a) supporting a gear blank between an opposed workpiece chuck and a tail stock supported by opposed first and second side walls of a unitary frame, the unitary frame further having a rear wall spanning and affixed to rear edges of the first and second side walls, and a bottom wall spanning and affixed to bottom edges of the first and second side walls, the bottom wall including a chip discharge aperture positioned beneath the gear blank when so held;

(b) synchronously rotating the gear blank against a cutter head supported by the unitary frame to cut teeth in the gear blank;

(c) directing heated metal chips from the cutting through the aperture without substantial thermal contact with the unitary frame.

16. The method of claim 15 further including the steps of:

(d) supporting the unitary frame on a separate stand beneath the aperture;

(e) isolating the unitary frame from the stand with respect to heat flow and dimensional changes of the stand;

whereby distortion of the unitary frame stand by heating of the stand from the chips is reduced.

17. The method of claim 16 including the step of:

(f) positioning an insulating container on the stand beneath the aperture to catch the chips.

* * * * *